United States Patent [19]
Paarsmarkt et al.

[11] Patent Number: 6,118,856
[45] Date of Patent: Sep. 12, 2000

[54] METHOD AND APPARATUS FOR AUTOMATICALLY FORWARDING AN EMAIL MESSAGE OR PORTION THEREOF TO A REMOTE DEVICE

[75] Inventors: James Benjamin Paarsmarkt; Brian Lawrence Buckler; Raymond Jay Vizer, all of Alberta, Canada

[73] Assignee: Nortel Networks Corporation, Montreal, Canada

[21] Appl. No.: 09/220,960

[22] Filed: Dec. 28, 1998

[51] Int. Cl.[7] .................................................. H04M 11/00
[52] U.S. Cl. ..................................... 379/93.24; 379/90.01; 455/412
[58] Field of Search ............................. 379/90.01, 93.01, 379/93.07, 93.14, 93.15, 93.17–93.21, 93.23, 93.24, 100.08; 358/402, 407; 455/32.1, 412, 556, 557; 340/825.44

[56] References Cited

U.S. PATENT DOCUMENTS

| | | | |
|---|---|---|---|
| 4,893,335 | 1/1990 | Fuller et al. | 379/200 |
| 4,920,560 | 4/1990 | Kageyama | 379/100 |
| 4,935,954 | 6/1990 | Thompson et al. | 379/89 |
| 4,942,598 | 7/1990 | Davis | 379/57 |
| 4,969,184 | 11/1990 | Gordon et al. | 379/100 |
| 5,262,860 | 11/1993 | Fitzpatrick et al. | 358/142 |
| 5,267,307 | 11/1993 | Izumi et al. | 379/354 |
| 5,343,516 | 8/1994 | Callele et al. | 379/98 |
| 5,398,280 | 3/1995 | MacConnell | 379/93 |
| 5,416,831 | 5/1995 | Chewning, III et al. | 379/96 |
| 5,434,911 | 7/1995 | Gray et al. | 379/106 |
| 5,530,740 | 6/1996 | Irribarren et al. | 379/89 |
| 5,742,905 | 4/1998 | Pepe et al. | 455/461 |
| 5,757,891 | 5/1998 | Wang | 379/93.24 |
| 5,768,528 | 6/1998 | Stumm | 395/200.61 |
| 5,802,166 | 9/1998 | Garcia et al. | 379/372 |
| 5,832,067 | 11/1998 | Herold | 379/110.01 |
| 5,844,969 | 12/1998 | Goldman et al. | 379/93.24 |
| 5,905,777 | 5/1999 | Foladare et al. | 379/93.24 |
| 5,937,161 | 8/1999 | Mulligan et al. | 379/93.24 |

FOREIGN PATENT DOCUMENTS

| | | | |
|---|---|---|---|
| 0413537 | 2/1991 | European Pat. Off. | 379/93.24 |
| WO95/04426 | 2/1995 | WIPO . | |
| WO 97/39532 | 10/1997 | WIPO | 379/93.24 |

OTHER PUBLICATIONS

Standard for the Format of ARPA Internet Text Messages; revised by David H. Crocker, Dept. of Electrical Engineering, University of Delaware, Newark, DE 19711. Network: DCrocker @ UDel–Relay. Internet site: http://www.stud.i-fi.uio.no/~larsi/notes/rfc822.txt. Aug. 13, 1982.

*Primary Examiner*—Wing F. Chan
*Attorney, Agent, or Firm*—Kevin L. Smith; Felsman, Bradley, Vaden, Gunter & Dillon, LLP

[57] ABSTRACT

A telephony apparatus is disclosed. The telephony apparatus has a receiver for receiving an email and a processor circuit having a communications port, for automatically forwarding at least a portion of the email from the communications port to a remote device, in response to receiving the email.

20 Claims, 7 Drawing Sheets

F/S = FLASH FILE
JVM = JAVA VIRTUAL MACHINE
RTX = REAL TIME XSERVER

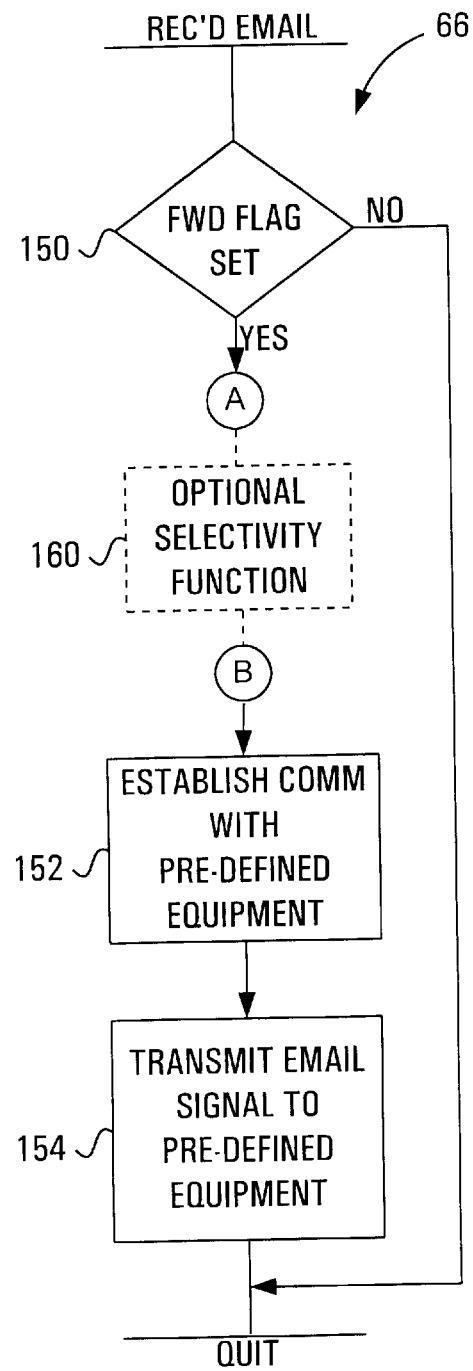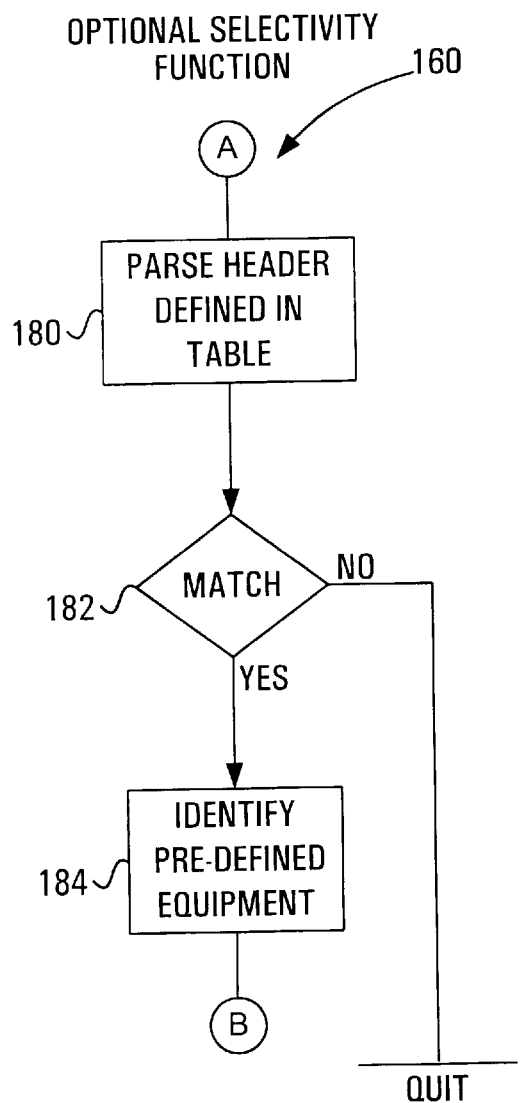
FIG. 8
FIG. 9

METHOD AND APPARATUS FOR AUTOMATICALLY FORWARDING AN EMAIL MESSAGE OR PORTION THEREOF TO A REMOTE DEVICE

FIELD OF THE INVENTION

The present invention relates to a method and apparatus for automatically forwarding at least a portion of a received email to a remote device and more particularly to a subscriber equipment telephony device for doing so.

BACKGROUND OF THE INVENTION

With the proliferation of email services in recent years, email subscribers are finding it increasingly desirable to be able to receive their email while they are away from their home or office computers.

Current methods of achieving remote email access include logging onto a computer from a remote location, or using a laptop or other portable computer with a cellular modem. Logging onto a computer requires accessibility and attention to such a computer, which may not be practical when in an automobile or in transit, for example. Portable computers and cellular modems are expensive, and users often have to pay costly per-minute connection fees for such cellular communications.

Also, with current access methods, if a user is anxiously awaiting a particular email, the user must either repetitively re-connect to his Internet Service Provider (ISP) to check for new email, or alternatively, must maintain an open connection until the particular email arrives. These approaches are impractical for many users, since they are inconvenient, time-consuming and/or expensive, especially where the connection is via a cellular modem.

Pagers have been used for remote receipt of messages, and existing use of pager technology has been extended to remotely display email. Such email is sent by an email server directly to a paging service and ultimately to a pager for display thereon. However, this service is available only if the particular ISP to whom the user subscribes offers a paging service, and only email received for the user at such an ISP is made available remotely to the user. This is limiting, as email can now be received at some telephones, for example, by ADSI signalling and some users have more than one email account on different servers. Thus, some users may have multiple sources of email. It would be desirable, therefore, to be able to remotely receive email received from any source or service, not just one particular ISP.

Taking another approach, the technology exists to receive messages in a telephone call and to forward such messages to a remote pager. One such system is described in U.S. Pat. No. 4,942,598 to Davis. This system does not readily lend itself to forwarding of email, however, for the same reasons as stated above, as email may come from more than one source. Furthermore, mere forwarding of an email may be undesirable, especially when the email is large. Thus, with the vast amount of information which can be received in an email, it would be desirable to select a particular portion of an email, for example, to be received and displayed remotely.

Also, similar to the problems discussed above, to avoid the necessity of subscribing to a particular ISP which forwards email to a telephone or pager, there is a need for a subscriber equipment telephony device which actively retrieves email or portions thereof from any ISP, and if desired, forwards such messages to a remote device.

Furthermore, it would be desirable to place at the control of the user the capability of determining when and where an email or portion thereof is to be forwarded for remote notification.

SUMMARY OF THE INVENTION

The present invention addresses the above needs by providing a method and apparatus for automatically forwarding at least a portion of a received email to a remote device. Email may be received from a plurality of different equipment types and selectively forwarded to one of a plurality of different equipment types, on the basis of the content of the email itself such as the headers, or on other conditions such as time of day. By using the apparatus and methods described herein, a user can specify conditions under which a received email is to be forwarded to a remote device. Furthermore, the user can define the particular remote device to which the email is to be forwarded. The function of forwarding the email occurs autonomously, without requiring interaction from the user at the time an email is received or after an email has been downloaded. Knowledge of a particular source of email is not necessary to forward the email. The selectivity of whether or not an email is to be forwarded may be derived from the content of the email itself and not necessarily on the source of the email. The user may instruct the apparatus to periodically actively retrieve email from an ISP and forward it to a remote device, and the user may provide such an instruction either at the apparatus or from a location remote therefrom.

In accordance with one aspect of the invention, there is provided a method involving receiving an email at a subscriber equipment and automatically forwarding at least a portion of the email from the subscriber equipment to a remote device in response to receiving the email.

Receiving may include receiving the email from an email service provider, receiving a message containing the email in an MDMF or ADMF signalling format or perhaps receiving the email in an SMTP format.

Communications with the source of the message may be initiated automatically and such source may include, for example, an email server or an email messaging platform at a central office.

Transmitting the email may include transmitting at least a portion of the email in a signalling format receivable by subscriber telephony equipment, or transmitting at least a portion of the email in a telocator alphanumeric paging protocol, for example.

Selective forwarding of the email may be done in response to at least a portion of the email when a predefined portion of the email matches pre-specified conditions, such as when the sender identification matches at least one pre-specified sender identification, for example.

In accordance with another aspect of the invention, there is provided a telephony apparatus having a receiver for receiving an email and a processor circuit having a communications port, for automatically forwarding at least a portion of the email from the communications port to a remote device, in response to receiving the email.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 8 is a flowchart of a forwarding routine run by the system processor shown in FIG. 2;

FIG. 9 is a flowchart of an optional selectivity function, optionally part of the forwarding routine shown in FIG. 8;

DETAILED DESCRIPTION

Figure 1:
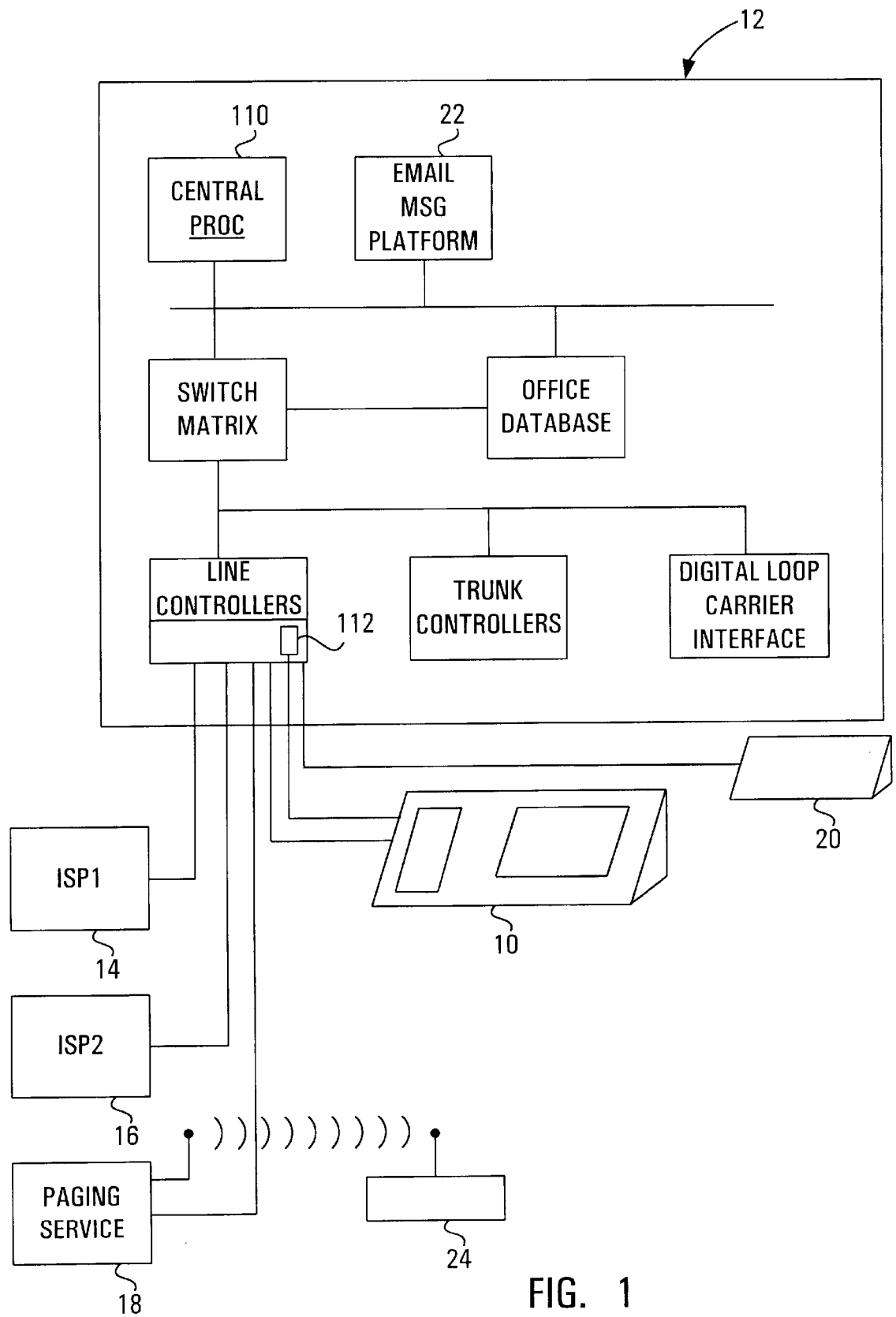
FIG. 1 is a block diagram of a system in which email messages or portions thereof are automatically forwarded, according to a first embodiment of the invention.

An apparatus for automatically forwarding an email or portion thereof to a remote device is shown generally at 10. In this embodiment, the apparatus includes a telephony device which acts as a web telephone operable to conduct conventional telephone calls and operable to communicate with an Internet services provider.

The telephony device 10 is connected to a central office shown generally at 12. In addition, first and second Internet services providers 14 and 16, a paging service 18 and a second user telephony device 20 are connected to respective line controllers of the central office.

The first and second Internet services providers (ISPs) 14 and 16 are operable to provide email services to subscribers, one of which is a user of the telephony device 10. In addition, the central office 12 has an internal email messaging platform 22.

The telephony device 10 has circuitry and software which allows it to communicate with the first or second Internet services providers 14 and 16 using conventional telephone lines, to receive email having a format according to the standard for the format of ARPA Internet Text Messages as disclosed in RFC 822 dated Aug. 13, 1982. Any transport protocol such as Simple Mail Transfer Protocol (SMTP), Internet Protocol (IP) for example, may be used to receive such email. Similarly, the telephony device 10 can receive email from the email messaging platform 22 through the central office in a Multiple Data Messaging Format (MDMF) or ADSI Data Messaging Format (ADMF). Thus, the telephony device 10 can receive email by at least three different methods.

Upon receipt of the email, the telephony device 10 is operable to transmit at least a portion of it to one of the ISP(s) 14 or 16, to the paging service 18 for display on a remote pager 24 or Personal Communications Device, or to the second user telephony device 20 for display thereon.

Figure 2:
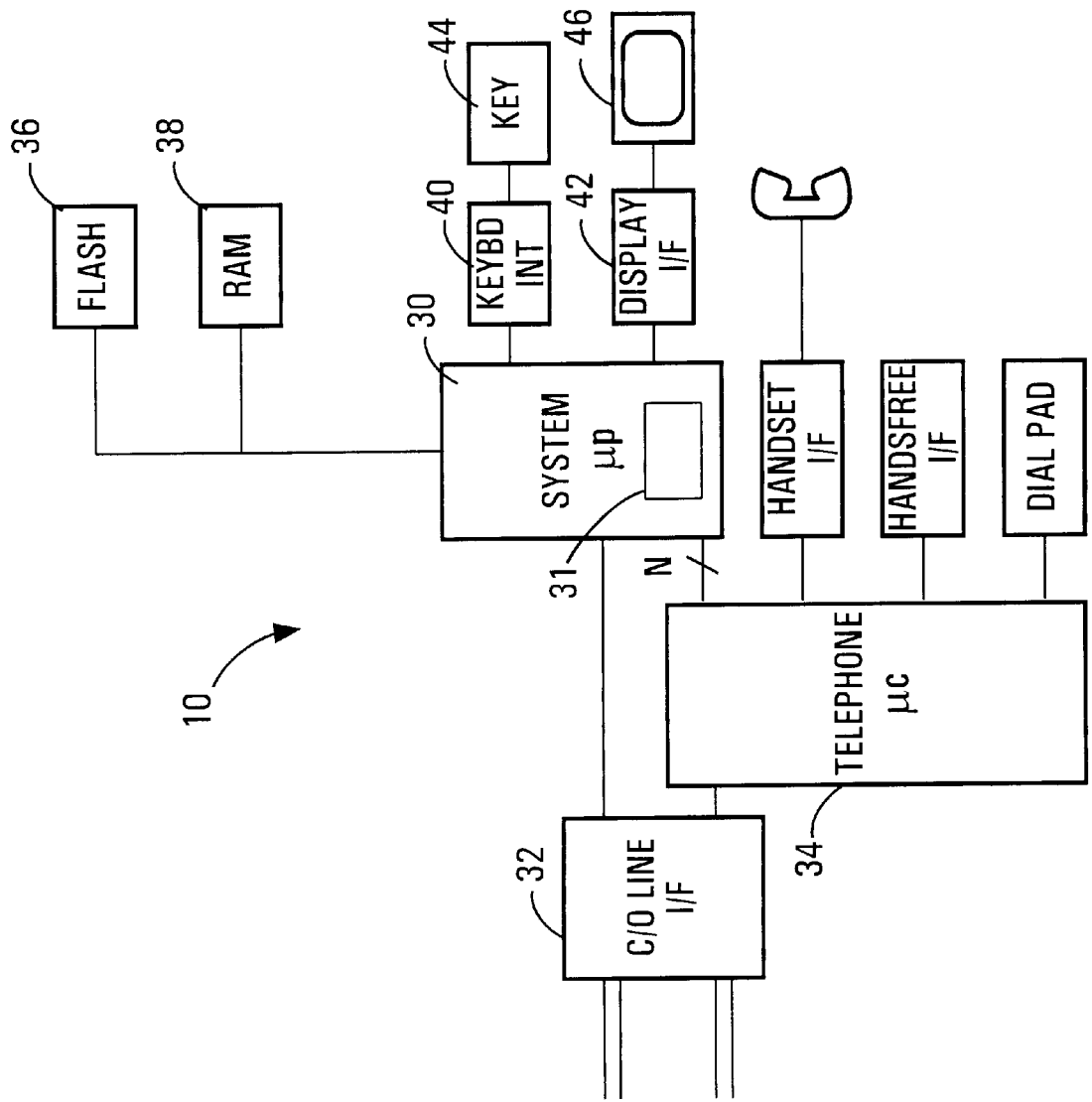
FIG. 2 is a block diagram of a telephony device according to the first embodiment of the invention.

The mechanism by which this functionality is provided is described beginning with reference to FIG. 2, in which a block diagram of internal circuitry of the telephony device is shown generally at 10. The internal circuitry includes a system processor 30 connected to a central office line interface 32 and a telephony microcontroller 34. The system processor is further in communication with FLASH memory 36, Random Access Memory (RAM) 38, a keyboard interface 40 and a display interface 42. The keyboard interface 40 is in communication with a keyboard 44 and the display interface 42 is in communication with a display 46.

Figure 3:
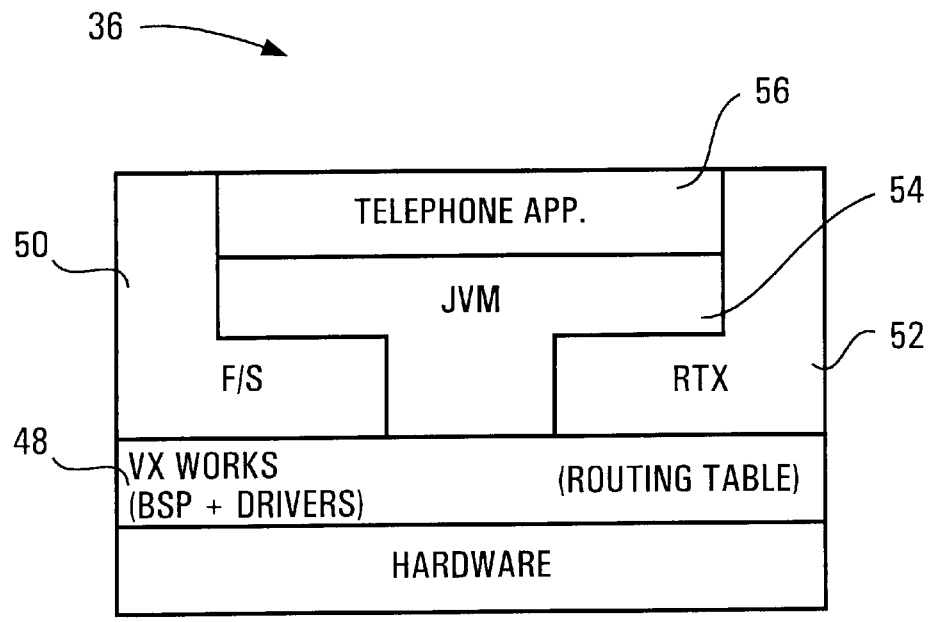
FIG. 3 is a schematic representation of program architecture in a system processor of the telephony device shown in FIG. 2.

Referring to FIGS. 2 and 3, the FLASH memory 36 stores codes for directing the system processor 30 to execute various functions. Such codes implement a low level operating system shown generally at 48, a file system shown generally at 50, a real time operating system shown generally at 52, a JAVA virtual machine shown generally at 54 and telephone application software shown generally at 56.

In this embodiment, the low level operating system is VX Works and the real time operating system is RTX. Other real time operating systems or combinations of hardware and software could alternatively be used. For example, an embedded controller with custom firmware may be used.

Figure 4:
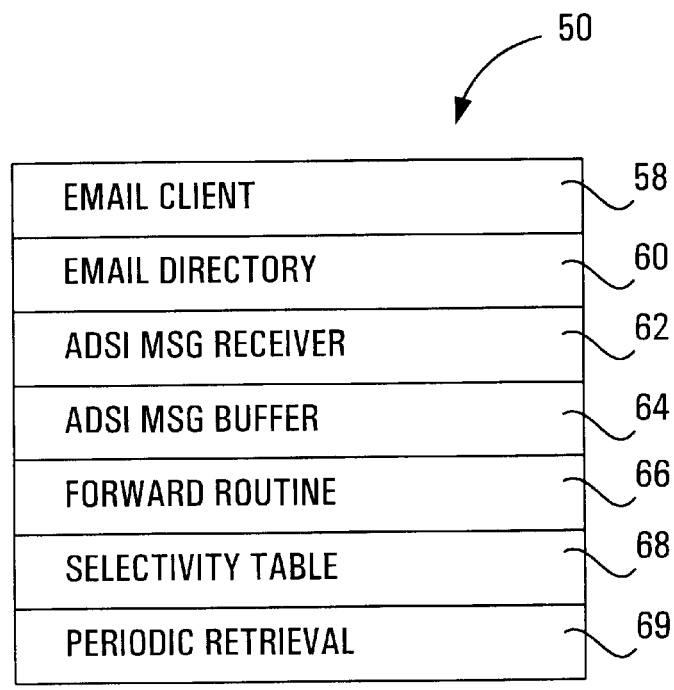
FIG. 4 is a schematic representation of partial contents of a file system of the computer program architecture shown in FIG. 3.

For this embodiment the file system is shown in greater detail at 50 in FIG. 4 and includes an email client program 58, an email directory 60, an Analog Display Services Interface (ADSI) receiver routine 62, an ADSI message buffer 64, a forward routine 66 and a selectivity table 68.

The email client 58 may be any email client capable of interacting with the central office line interface 32 to download an email into the email directory 60.

Figure 5:
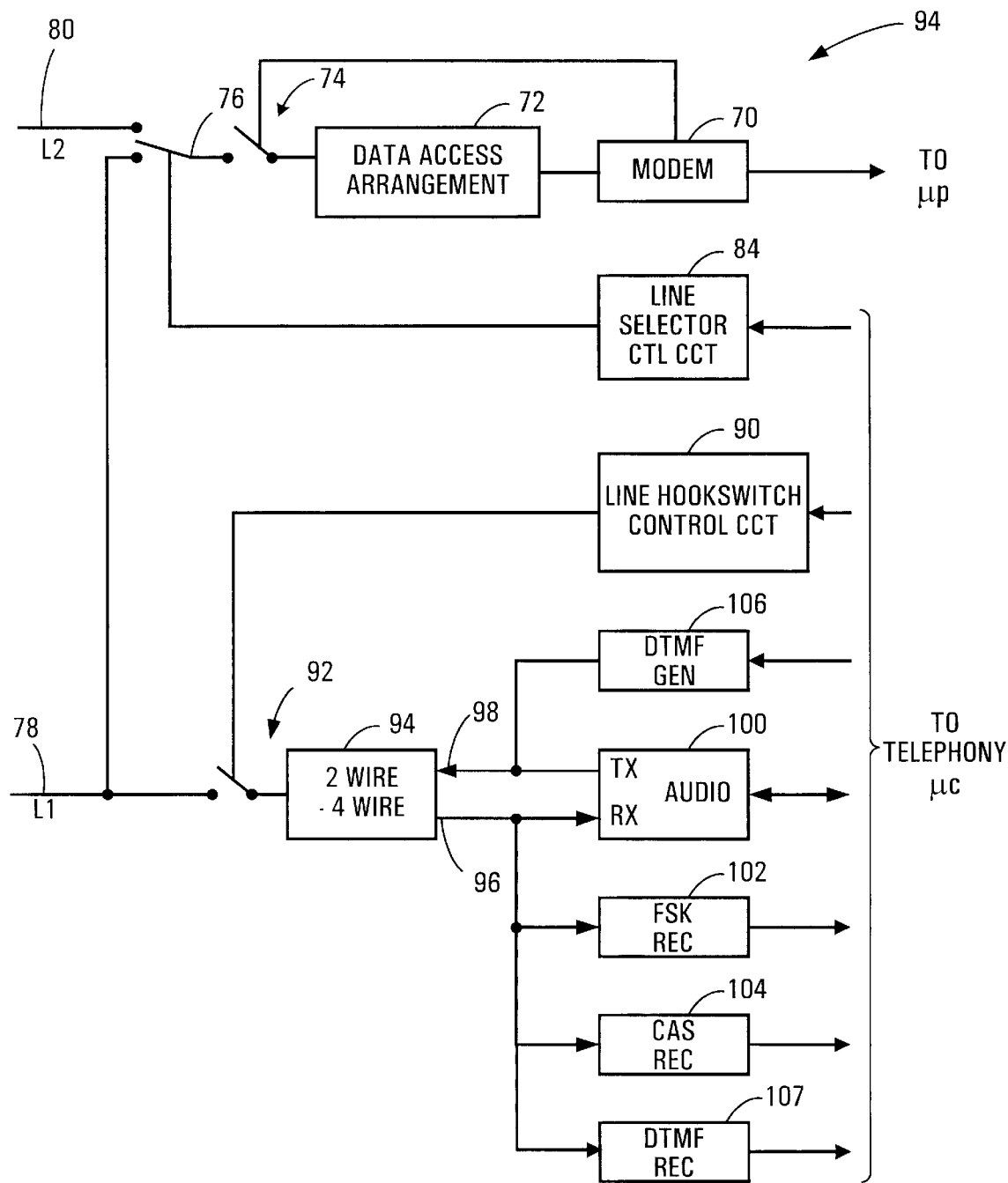
FIG. 5 is a block diagram of a central office interface of the telephony device shown in FIG. 2.

Referring to FIG. 5, to facilitate such download, the central office interface includes a modem 70 which is connected directly to and controlled by the system processor 30 shown in FIG. 2.

Referring back to FIG. 5, the modem is connected to a data access arrangement 72 which is connected to a hook-switch 74. Opening and closing of the hookswitch is controlled by the modem 70 under the control of the system processor 30. Alternatively, the hookswitch may be controlled by the telephony microcontroller 34.

The hookswitch is further connected to a line selector switch 76 for selecting between first and second telephone lines 78 and 80 respectively. A line selector circuit 84 controlled by the telephony microcontroller controls which of the lines is to be used by the data access arrangement 72. Thus, to cause the telephony microcontroller to select a particular line, the system processor 30 communicates with the telephony microcontroller 34 to cause the line selector circuit 84 to select an appropriate line. Effectively, whichever line is not in use, with preference to the second line 80, will be selected. Thus, the email client 58 shown in FIG. 4, cooperates with the modem and data access arrangement shown in FIG. 5, to establish a connection to one of the Internet services providers 14 or 16 shown in FIG. 1. The email client then uses an appropriate protocol such as the post office protocol (POP3), the Internet message access protocol (IMAP), or the Simple Mail Transfer Protocol (SMTP), for example, to load an email from the Internet services provider into the email directory 60. Thus, the email client modem and data access arrangement act as a receiver for receiving email from an email service provider.

Alternatively, an email may be received in an MDMF signalling format or an ADSI message in ADMF format received on the first telephone line 78 shown in FIG. 5.

Referring back to FIG. 1, the email messaging platform 22 may receive an email using standard protocols, from one of the Internet services providers 14 or 16 and store such email locally within the central office. The email platform then communicates with a central processor 110 of the central office to produce an MDMF or ADMF message. For example, assume an ADMF message is produced, in which case an ADSI message in an FSK signalling format is produced at a line controller 112 connected to the telephony device 10. In this manner, ADSI messages, including at least a portion of the email from the email messaging platform 22, are communicated to the telephony device 10.

To facilitate receipt of such messages, the central office line interface shown in FIG. 5 includes a line hookswitch control circuit 90 for controlling a line hookswitch 92 connected to the first telephone line 78. The line hookswitch 92 is connected to a two-to-four wire hybrid 94 which has a receive output 96 and a transmit input 98. The receive output is connected to a receive input of an audio circuit 100 and is further connected to a frequency shift keyed (FSK) receiver 102 and a caller alerting signal (CAS) receiver 104. The audio circuit, FSK receiver 102 and CAS receiver 104 are connected to the telephony microcontroller. The telephony microcontroller is also connected to a DTMF generator 106 and a DTMF receiver 107. The DTMF generator 106 is connected to the transmit input 98 of the two-to-four wire hybrid 94 for transmission of DTMF signals on the first telephone line 78 and the DTMF receiver is connected to the receive input 96 of the two-to-four wire hybrid 94 for receiving DTMF signals from the first telephone line 78.

FSK signals representing ASDI messages are received at the FSK receiver 102 from the telephone line and are provided to the telephony microcontroller. The telephony microcontroller runs the ADSI message receiver routine 62 shown in FIG. 4, upon receipt of a CAS signal at the CAS receiver 104. The mechanism for receiving ADSI messages at a telephone is well known and, therefore, the functioning of the ADSI receiver routine 62 would be well known to one of ordinary skill in the art.

Effectively, the ADSI receiver routine 62 receives in the ADSI message buffer 64, an ADSI message containing at least a portion of an email.

Figure 6:
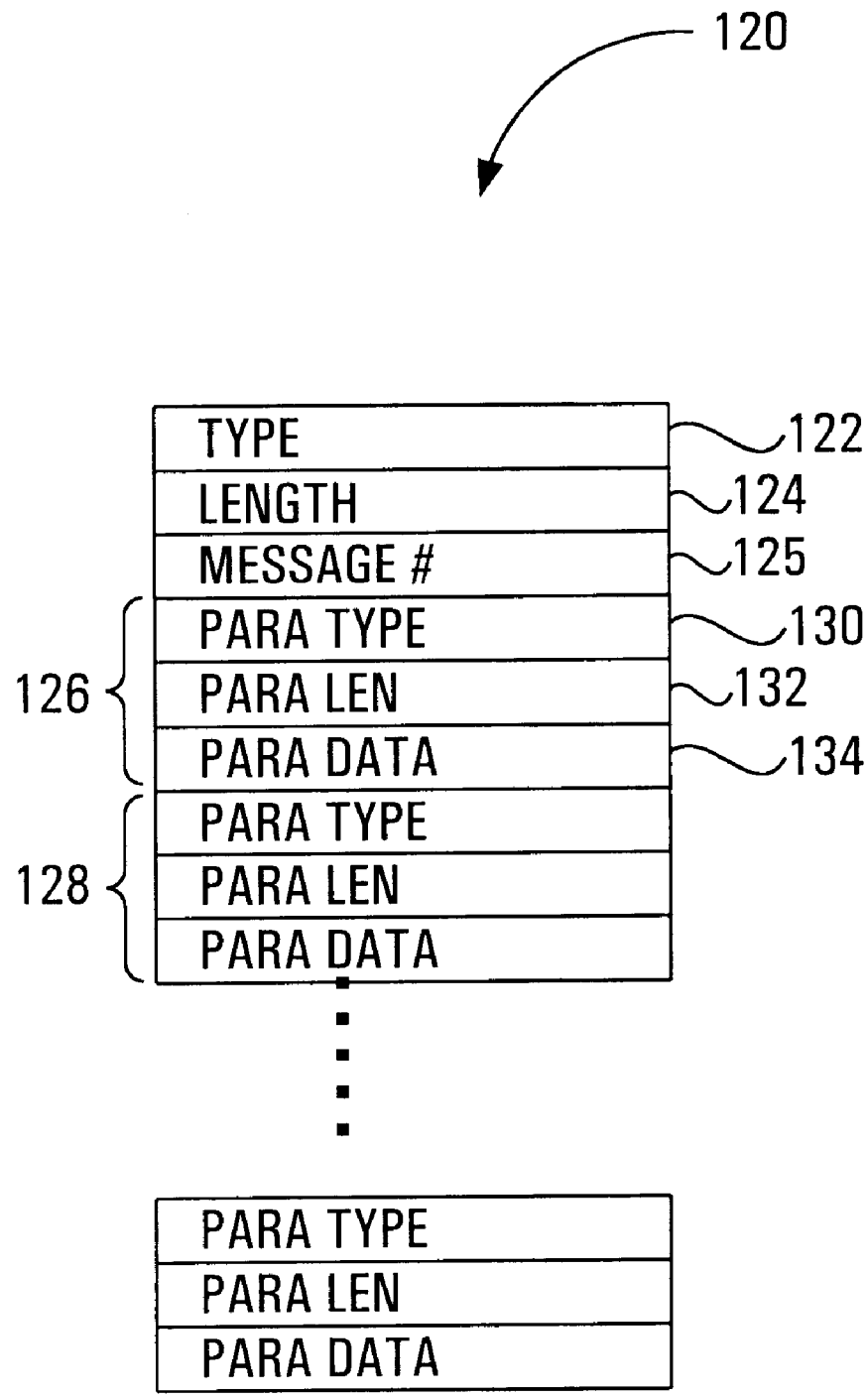
FIG. 6 is a schematic representation of an ADSI message structure for communicating email in an ADMF signalling format.

Referring to FIG. 6, ADSI messages containing at least a portion of an email, have a structure shown at 120 in FIG. 6.

As is known by those knowledgeable of ADSI messages, ADSI messages have a type field 122, a length field 124 a message number field 125 and a plurality of data units, two of which are shown at 126 and 128. Each data unit includes a parameter type field 130, a parameter length field 132 and a parameter data field 134.

In order to facilitate the transfer of email using ADSI messages, a unique parameter type identifying the contents of the parameter data field 134 as email data is stored in the parameter type field 130 by the central processor at the central office.

The parameter data field 134 holds bytes representing data comprising the email. In the case of a very short email, there may only be one data unit 126. Alternatively, a plurality of emails may be transmitted in respective data units 126, 128, etc., or portions of an email may be associated with respective data units 126, 128, etc.

In any event, upon receipt of an ADSI message containing email or a portion thereof, the contents of the parameter data field 134 of each data unit 126, 128, etc., are pieced together to reconstruct (if necessary), the entire email into a form in which it would have been received if it were retrieved directly from one of the Internet services providers 14 or 16 shown in FIG. 1. The reconstructed email is stored in the email directory 60. Thus, in effect, all email, whether received directly from an Internet services provider or whether received in an ADSI message, are stored in the email directory complete. Thus, the ADSI message routine and system processor and telephony microcontroller cooperate to act as a receiver for receiving email in an MDMF or ADMF signalling format.

Figure 7:
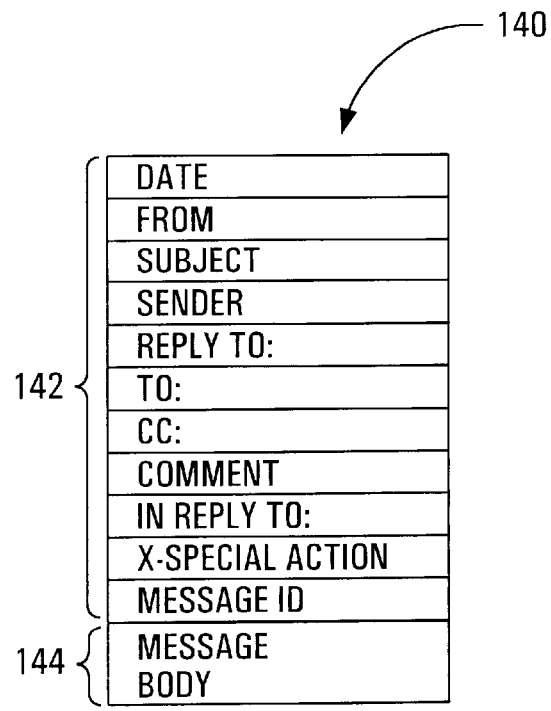
FIG. 7 is a schematic representation of an email.

Referring to FIG. 7, email has a format as shown generally at 140. Such format includes a plurality of headers 142 and a message body 144. This format is in accordance with the standard for The Format of ARPA Internet Text Messages as specified in RFC 822 dated Aug. 13, 1982. In general, the headers 142 and message body define the content of an email.

In a simple form of the invention, upon receipt of an email, the forward routine shown at 66 in FIG. 8 is executed. The forward routine begins with a first block 150 which directs the system processor to determine whether or not a forward flag has been previously set by the user. The forward flag is set by the user to indicate that email is to be forwarded, and may be set by the user either at the telephony device, or remotely, by telephoning the telephony device and entering an appropriate sequence of DTMF tones for receipt by the DTMF receiver 107.

Next, in the simple form of the invention, block 152 directs the system processor to communicate with the modem 70 shown in FIG. 5 or the telephony microcontroller 34 shown in FIG. 2 to establish communications with predefined equipment. Such predefined equipment may include one of the Internet services providers 14 or 16, the paging service 18, which may include a personal communication system (PCS) device, or the second user telephony device 20, for example. Then, depending upon which equipment communications has been established with, block 154 directs the system processor to cause a signal representing the email to be transmitted to the equipment.

In the event that the equipment is an Internet services provider 14 or 16, communications are established using the modem 70 and an email is sent directly to the Internet services provider using the modem 70, following the usual transport protocols such as SMTP, for example. The modem thus acts as a communications port controlled by the processor circuit for transmitting at least a portion of the email to a remote internet services provider.

Alternatively, if the predefined equipment is the paging service 18, the system microprocessor communicates with the telephony microcontroller 34 to dial a telephone number of the paging service 18. Alteratively, the modem 70 may be used to dial the telephone number of the paging service 18.

After having established a connection with the paging service 18, the system processor 30 transmits at least a portion of the email according to the Telocator Alphanumeric Paging Protocol (TAP). Upon receipt of the email in this format, the paging service automatically transmits a signal to a remote pager 24 (or Personal Communication Device) for remote display of the email.

If the predefined equipment is the second user telephony device 20, the system microprocessor communicates with the telephony microcontroller 34 to cause the DTMF generator 106 to dial a telephone number of the second user telephony device 20. Upon dialing the telephone number, the modem 70 is used to establish data communications with the second user telephony device 20 or signals the second subscriber telephone with MDMF or ADMF messaging signals and provides MDMF or ADMF messages to the second user telephony device 20 for receipt in the same manner in which the first telephony device 10 receives messages according to such signalling formats. Thus, at least a portion of the email is transmitted by the modem in a signalling format receivable by subscriber telephony equipment. The modem thus acts as a communications port for signalling a remote device and more particularly for forwarding at least a portion of the email to a remote device.

The telephony device 10 may forward an email to one or a subset of a plurality of remote devices. The remote devices themselves may also forward the email.

Alternatively, it may be desirable to send only a portion of the email. For example, it may be desirable to forward only the headers 142 of the email shown in FIG. 7. Or, perhaps a combination of particular headers such as the sender header and the message body.

Advantageously, the telephony device need not rely on an ISP or other email server or service to transmit email messages to the telephony device. As shown in FIG. 2, the system processor 30 includes a timer 31, and the file system 50 may further include a periodic retrieval routine 69. When a periodic retrieval flag has been set by a user of the telephony device, the periodic retrieval routine is periodically initiated to direct the system processor 30 to establish communications with a specified email service provider such as one of the ISPs 14 or 16, for example, to check for new email received at the email service provider, and if any is present, to download such email and store it in the email directory 60, as described above. The system processor is then directed to enter the forward routine 66 at block 150, and the periodic retrieval routine is ended. A user of the telephony device may set the periodic retrieval flag either at the telephony device, or from a remote location, by telephoning the telephony device and entering an appropriate sequence of DTMF tones for receipt by the DTMF receiver 107. A user may similarly select the time interval at which the telephony device will initiate communications to actively check for email, such as once every ten minutes, for example. Thus, the processor circuit is programmed to initiate communications with a source of email to enable receipt of such email.

Figure 10:
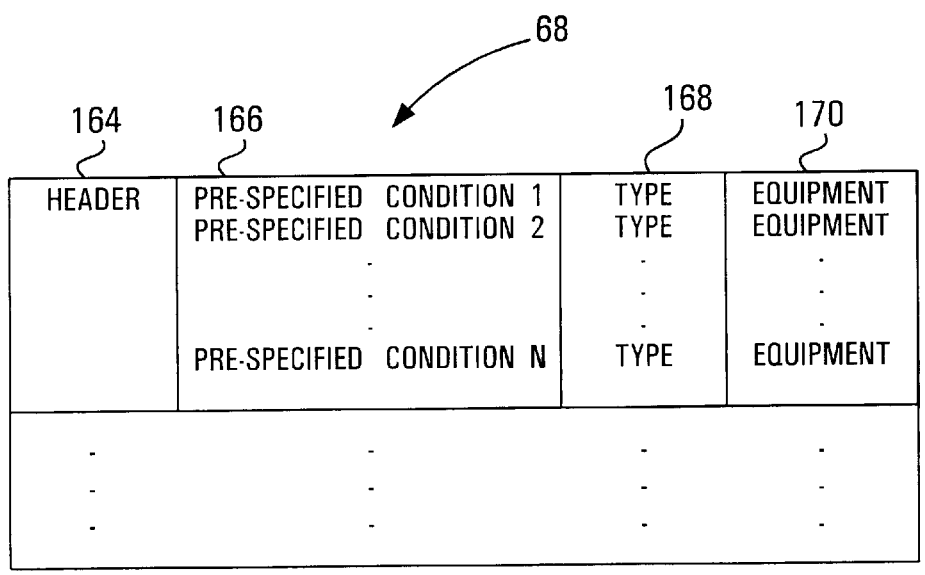
FIG. 10 is a schematic representation of a selectivity table accessible by the system processor shown in FIG. 2 when running the forwarding routine shown in FIG. 8.

Referring back to FIG. 8, before establishing communications with predefined equipment, the forward routine may include an optional selectivity function indicated generally at 160. Referring to FIGS. 9 and 10, the selectivity function 160 cooperates with the selectivity table shown generally at 68 in FIG. 10. The selectivity table is user-programmable and includes a header field 164, a pre-specified condition field 166, a type field 168 and an equipment field 170. The header field 164 is used to identify at least one header 142 in the email shown at 140 in FIG. 7.

The pre-specified condition field 166 is used to hold data identifying header conditions under which forwarding is to occur.

The type field 168 is used to hold a code indicating a type of device to which the email will be forwarded and may include, for example, a code identifying an email server, a paging service or a subscriber call. Such code may include a personal identification number (PIN) of a paging system for example.

The equipment field 170 holds an email address when the corresponding type field 168 identifies the forwarding device as an email server, holds a telephone number of a paging service where the corresponding type field 168 indicates that the device to which email is to be forwarded is a paging service provider and holds a telephone number where the corresponding type field 168 indicates that the email is to be forwarded in a telephone call.

It will be appreciated that a single header field 164 may be associated with a plurality of pre-specified condition fields 166, type fields 168 and equipment fields 170 to permit different conditions or the same conditions to cause an email to be forwarded to the same or different devices. Functions of the contents of headers specified in the header field 164, such as boolean functions, may be included within the pre-specified condition field 166, for example.

To illustrate the use of the table, please refer to FIG. 9 which illustrates the optional selectivity function routine 160. This routine begins with a first block 180 which directs the system processor to address the header field(s) 164 in the selectivity table 68 to determine which of the headers 142 in FIG. 7 is to be parsed.

Block 182 directs the system processor to parse the identified header fields and determine whether or not any of the conditions stored in the pre-specified condition field 166 are met. This may involve evaluating a complex function described in the pre-specified condition field 166 such as (date GREATER THAN Jan. 1, 1999) AND (sender EQUAL wife) or reading a pre-specified sender identification, for example.

If none of the conditions are met, the forward routine is ended and the email is not forwarded. Otherwise, if the pre-specified conditions are met block 184 directs the system processor to read the corresponding type field 168 of the table 68 shown in FIG. 10, to determine the equipment type to which the email is to be forwarded. Knowing the equipment type, the appropriate signalling format, i.e., SMTP or Telocator Alphanumeric Paging Protocol or ADMF, for example, can be determined.

Then, the system processor is directed to read the contents of the equipment field 170 to determine an email address or telephone number to which the email is to be forwarded. The contents of the type and equipment and fields thus act as a pre-specified remote device identification readable by the processor.

The optional selectivity routine is then completed and the processor is directed to blocks 152 and 154 in FIG. 8 to perform the functions as described above in connection with these blocks.

In the above manner, at least a portion of an email is selectively forwarded to one of a plurality of different equipment types, on the basis of the content of the email itself, in particular, the content of headers 142 shown in FIG. 7. Thus, the processor circuit is programmed to selectively forward at least a portion of the email when a predefined portion of the email meets a pre-specified condition.

Alternatively, the email may be forwarded on the basis of the inclusion of key words in the message body 144 of the email, for example. Or, email may be accumulated in the email directory and unconditionally or selectively forwarded at a particular time of day.

By using the apparatus and methods described herein, a user can program the contents of the selectivity table 68 shown in FIG. 10, to specify conditions under which a received email is to be forwarded to a remote device. Furthermore, the user can define the particular remote device to which the email is to be forwarded and the telephony device 10 can actually perform the functions of forwarding the email autonomously, without requiring interaction from the user or sender of the email at the time an email is received or after an email has been downloaded.

In addition, a forwardable email can be received from different sources such as an ISP or email messaging platform and if desired can be forwarded without regard to such sources. Rather, the email may simply be handled on the basis of the content of the email itself, for example. In other words, the selectivity of whether or not an email is to be forwarded can be derived from the content of the email itself and need not necessarily be derived from the source of the email.

Finally, while implementation of the software for directing the system microprocessor to execute the functionality described above has been described as including a JAVA virtual machine, it will be appreciated that such functionality can be provided by software routines which directly control the system microprocessor. Also, while a two-line telephone has been described, the same features of the invention can be achieved with a single line telephone.

While specific embodiments of the invention have been described and illustrated, such embodiments should be considered illustrative of the invention only and not as limiting the invention as construed in accordance with the accompanying claims.

What is claimed is:

1. A subscriber telephony apparatus comprising:
   a) an email receiver for receiving an email from one of a plurality of e-mail service providers at said subscriber telephony apparatus, said subscriber telephone apparatus capable of selective communication with each of said plurality of e-mail service providers via a telephone network;
   b) a processor circuit programmed to determine whether or not said email is from a pre-specified system or person; and
   c) a communication sport controlled by said processor circuit for transmitting signals from said subscriber telephony apparatus to a remote device when said email is from said pre-specified system or person.

2. An apparatus as claimed in claim 1 wherein said communications port is operable to transmit at least a portion of said email.

3. a method comprising:
   a) receiving an email from one of a plurality of e-mail service providers at a subscriber telephony equipment capable of selective communication with each of said plurality of e-mail service providers via a telephone network; and
   b) automatically forwarding at least a portion of said email from said subscriber telephony equipment to a remote device in response to said receiving of said email.

4. A method as claimed in claim 3 wherein receiving comprises receiving said email in an SMTP format.

5. A method as claimed in claim 3, wherein receiving comprises receiving said email in a MDMF (Multiple Data Messaging Format) or ADMT (Analog Display Services Interface (ADSI) Data Messaging Format) signaling format.

6. A method as claimed in claim 3 wherein forwarding comprises transmitting said at least a portion of said email in a telocator alphanumeric paging protocol.

7. A method as claimed in claim 3 further comprising initiating communications with a source of said email to permit receiving.

8. A method as claimed in claim 7 wherein initiating communications comprises establishing communications between said subscriber equipment and an email server.

9. A method as claimed in claim 3 wherein forwarding comprises transmitting said at least a portion of said email in a signalling format receivable by subscriber telephony equipment.

10. A method as claimed in claim 3 further comprising selectively forwarding said at least a portion of said email when a predefined portion of said email matches pre-specified conditions.

11. A method as claimed in claim 10 wherein forwarding comprises forwarding when said sender identification matches at least one pre-specified sender identification.

12. A method as claimed in claim 11 wherein forwarding comprises forwarding to a pre-specified remote device when said sender identification matches at least one pre-specified sender identification.

13. A subscriber telephony apparatus comprising:
   a) a receiver for receiving an email from one of a plurality of e-mail service providers at said subscriber telephony apparatus, said subscriber telephone apparatus capable of selected communication with each of said plurality of e-mail service providers via telephone network; and
   b) a processor circuit having a communications port, said processor circuit being programmed to control said communications port to automatically forward at least a portion of said email from said subscriber telephony apparatus to a remote device, in response to receiving said email at said subscriber telephony apparatus.

14. An apparatus as claimed in claim 13 wherein said processor circuit is programmed to selectively forward said at least a portion of said email when a predefined portion of said email meets pre-specified data.

15. An apparatus as claimed in claim 14 further comprising at least one pre-specified sender identification readable by said processor circuit and wherein said processor circuit is programmed to forward when said sender identification matches said at least one pre-specified sender identification.

16. An apparatus as claimed in claim 15 further comprising at least one pre-specified remote device identification readable by said processor circuit and wherein said processor circuit is programmed to forward to said pre-specified remote device when said sender identification matches at least one pre-specified sender identification.

17. An apparatus as claimed in claim 13 wherein said processor circuit is programmed to transmit said at least a portion of said email in a signalling format receivable by subscriber telephony equipment.

18. An apparatus as claimed in claim 13 wherein said receiver is operable to receive said email in a MDMF (Multiple Data Messaging Format) or ADMF (Analog Display Services Interface (ADSI) Data messaging Format) signalling format.

19. An apparatus as claimed in claim 13 wherein said receiver is operable to receive said email in an SMTP format.

20. An apparatus as claimed in claim 13 wherein said processor circuit is programmed to transmit said at least a portion of said email in a telocator alphanumeric paging protocol.

* * * * *